July 3, 1962 A. L. BONNER 3,042,759

NEGATIVE IMPEDANCE REPEATERS

Filed Aug. 5, 1959

INVENTOR
A. L. BONNER
BY R. B. Ardis
ATTORNEY 3,042,759

NEGATIVE IMPEDANCE REPEATERS

Arthur L. Bonner, Andover, Mass., assignor to Bell Telephone Laboratories, Incorporated, New York, N.Y., a corporation of New York Filed Aug. 5, 1959, Ser. No. 831,869
12 Claims. (Cl. 179—170)

This invention relates generally to negative impedance circuits and more particularly to circuits employing negative impedance converters, which over a prescribed frequency range present an impedance which is negatively related to a passive terminating impedance.

As outlined by George Crisson in his article on "Negative Impedances and the Twin 21-Type Repeater," appearing at page 485 of the July 1931 issue of the Bell System Technical Journal, negative impedances fall into one or the other of two categories. The first of these includes negative impedances of the so-called series or reversed voltage type. Such negative impedances are open-circuit stable and can, in general, be connected in series with a transmission line to produce amplification without rendering the line self-oscillatory. The second group includes negative impedances of the so-called shunt or reversed current type. Such negative impedances are short-circuit stable and can, in general, be connected in shunt across a transmission line without rendering the line self-oscillatory. Negative impedances of both types are often used together to reduce the loss of a transmission line below the level which would be achieved by the use of only a single negative impedance. While negative impedances can be produced by a wide variety of circuits, the most versatile of these are the circuits known as negative impedance converters, which produce a two-terminal impedance that is negatively related to a specific passive terminating impedance. This passive terminating impedance can generally be varied at will, within the limits of converter and system stability, to provide the combination of gain and phase angle required. The resulting negative impedance exists, of course, only over the chosen operating frequency range of the transmission line with which it is used.

In the past, some of the most satisfactory vacuum tube negative impedance converters have been those of the positive feedback type disclosed, for example, in United States Patent 2,878,325, which issued March 17, 1959, to J. L. Merrill, Jr., while some of the most satisfactory transistor negative impedance circuits have been the positive feedback converters disclosed in United States Patent 2,726,370, which issued December 6, 1955, to J. G. Linvill and R. L. Wallace, Jr. Both patents show negative impedance converters for transforming passive terminating impedances into negative impedances of both the series and the shunt type, while the Merrill patent additionally illustrates the manner in which converters producing both types of negative impedance are used together to form the most effective type of voice-frequency negative impedance telephone repeater.

The negative impedance converters disclosed in the Merrill and Linvill-Wallace patents are usually provided with complex terminating impedance networks which accurately match the impedance of the transmission line with which they are used over the signal frequency band. Repeater gain adjustments with such circuits are, however, relatively complex undertakings because of the interdependence of repeater gain and phase angle. As a result, every shift of network resistance to adjust repeater gain requires a compensating adjustment of network reactance if the repeater phase angle is to remain the same. Such adjustments are not only time consuming but also require the use of complex equipment and demand a high degree of training on the part of installation and maintenance personnel.

It has been suggested that such complicated adjustments could be avoided by using matching networks to transform line impedances to substantially pure resistances at repeater points and by terminating negative impedance converters in pure resistances instead of complex impedances. Application Serial No. 737,159, filed May 22, 1958, now Patent No. 2,978,542 by R. L. Huxtable, now United States Patent No. 2,978,542, issued April 4, 1961, discloses impedance matching networks which may be used for such purposes. Repeater gain can then be varied by simple resistance adjustments and no phase angle is involved. While quite satisfactory for many purposes, such an arrangement still leaves something to be desired when a repeater using both series and shunt converters is used on voice-frequency telephone lines. The direct-current dial and other signaling impulses which it is necessary to transmit over such lines are seriously distorted by the relatively large blocking capacitors needed for a shunt resistance converter. It has been found, however, that smaller blocking capacitors can be used and such distortion avoided if the impedance matching networks are made to transform the line impedances to values having capacitive as well as resistive components and if the converters are terminated accordingly. The terminating network capacitors assist in preventing undue attenuation of signaling impulses and thus permit the use of smaller blocking capacitors. In addition to networks transforming the line impedance to a pure resistance as in the Huxtable application, application Serial No. 737,161, filed May 22, 1958, by R. W. De Monte, now United States Patent No. 2,957,944, issued October 25, 1960, shows a network transforming the line impedance to a standard impedance consisting of a 900 ohm resistance in series with a 2 microfarad capacitance. Use of a complex resistance-capacitance terminating network for the shunt negative impedance converters to solve the signal pulse problem, however, tends to restore the original problem of interdependence of repeater gain and phase angle.

A principal object of the present invention, therefore, is to simplify gain adjustments in repeaters employing one or more negative impedance converters without interfering with the transmission of direct-current signaling impulses.

Another and more particular object is to make the phase angle of a negative impedance repeater independent of the repeater gain setting without interfering with the transmission of direct-current signaling impulses.

Broadly, the invention solves these problems by terminating a negative impedance converter of the positive feedback type in a substantially pure resistance and incorporating a fixed phase-shifting network in its positive feedback path. The converter now has a constant phase angle which is independent of gain, and adjustments to the latter are made by simple changes in the magnitude of the terminating resistance. Applied to the shunt converter of a voice-frequency negative impedance telephone repeater, the invention permits sufficient reduction in the size of blocking capacitors to avoid distortion of direct-current signaling impulses. As taught in the above-identified De Monte application, the line is given a phase angle matching that of the converter at each repeater point through the use of suitable impedance matching networks.

In a negative impedance reperater using both series and shunt negative impedance converters, the phase angle may, in accordance with a subsidiary feature of the invention, be imparted solely by the shunt converter. The objects of the invention are thereby realized with the absolute minimum of expense and with the ultimate in circuit simplicity. In such an arrangement, a series converter is left without a phase-shifting network in its positive feedback circuit path but is still terminated in a substantially pure resistance. The entire phase angle for the repeater is provided by the phase-shifting network included in the positive feedback circuit path of the shunt negative impedance converter. Gain is adjusted by adjusting the magnitudes of the terminating resistors of both converters.

An important additional benefit afforded by application of the invention to the shunt converter of a negative impedance repeater using both series and shunt converters is the effect upon the gain-frequency characteristic of the repeater. When a fixed phase-shifting network is incorporated into the positive feedback path of the shunt converter in accordance with the principles of the invention, the slope of the gain-frequency characteristic of the repeater is made to vary with the repeater gain setting. Since the slope of the loss-frequency characteristic of the usual telephone transmission line varies with the length, and hence the loss, of the line, nearly ideal repeater performance is obtained.

A more complete understanding of the invention may be obtained from the following detailed description of specific embodiments. In the drawing.

Figure 1:
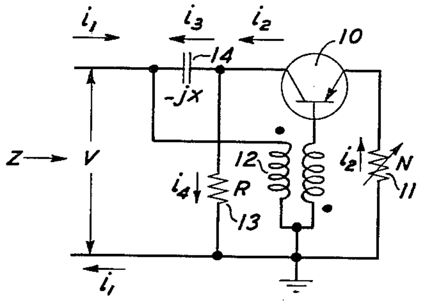
FIG. 1 is a simplified schematic of a single-sided shunt transistor negative impedance converter embodying the invention.

The embodiment of the invention shown in FIG. 1 uses only a single p-n-p transistor 10. All biasing circuitry is omitted for the sake of simplicity and, for the same reason, transistor 10 is assumed to have nearly ideal characteristics. In other words, transistor 10 is assumed to have a common base current amplification factor $\alpha$ equal to unity, to draw no base current, and to have an internal emitter-to-base resistance of zero. Although actual transistors depart somewhat from these characteristics, the assumption remains sufficiently accurate to make the resulting calculations a useful approximation of actual circuit performance. A transistor of the opposite conductivity type may, of course, be used with equal success.

In FIG. 1, a variable terminating resistor 11 is connected from the emitter or current-emissive electrode of transistor 10 to ground. Since the converter is essentially a two-terminal device, presenting a negative impedance between a pair of terminals in much the same way an ordinary passive impedance element presents a positive impedance between its two terminals, it lacks separate input and output circuits. Instead they are combined and, in FIG. 1, this combined input and output circuit is connected between the collector or current-receiving electrode of transistor 10 and ground. The base electrode of transistor 10, which functions as a control electrode for current flowing between the emitter and collector electrodes, is returned to ground through the primary winding of a phase-inverting transformer 12. The positive feedback circuit path necessary to the operation of the converter is completed by the secondary winding of transformer 12, which is returned to ground from the collector electrode of transistor 10. Finally, the phase-shifting network provided by the present invention is included in the positive feedback path. Specifically, a resistor 13 is returned directly to ground from the collector electrode of transistor 10 and a capacitor 14 is connected in series between the collector electrode of transistor 10 and the secondary winding of transformer 12.

The manner in which the negative impedance converter illustrated in FIG. 1 produces a negative impedance at its combined input and output terminals can be explained very simply. The phase-shifting network formed by resistor 13 and capacitor 14 is neglected in this initial rough description. The voltage appearing across the converter terminals is reversed in phase by transformer 12 and applied to the base electrode of transistor 10. It thus appears at the emitter practically undiminished because of the low internal impedance of the transistor between emitter and base. This voltage causes a current to flow in terminating resistor 11. Practically all of this current flows into the emitter and out of the collector of transistor 10. The current flowing out of the collector, however, is reversed in phase from the current flowing from the external line. The effect of the circuit thus is to develop a negative impedance across its external terminals. Since the current flowing out of the collector is reversed in phase, the negative impedance is classified as being of the "reverse current" type.

The rough description of converter operation which has just been given does not, of course, take cognizance of the present invention. The effect of the invention is best illustrated by some simple calculations. The symbols for these calculations are indicated in FIG. 1: Z is the impedance presented by the converter at its combined input and output terminals, V is the voltage across these terminals, $i_1$ is the current flowing into the ungrounded converter terminal and out of the grounded terminal, $i_2$ is the current flowing in terminating resistor 11 and in the internal emitter-collector path of transistor 10, $i_3$ is the current flowing through capacitor 14, $i_4$ is the current flowing through resistor 13, N is the value of resistor 11, R is the value of resistor 13, and $-jX$ is the impedance of capacitor 14.

By definition, $$Z=\frac{V}{i_1} \tag{1}$$

The circuit equations of FIG. 1 are $$i_1=-i_3 \tag{2}$$

$$i_2=i_3+i_4 \tag{3}$$

$$V=i_2N \tag{4}$$

and $$V=ji_3X+i_4R \tag{5}$$

From Equations 2, 3, and 4, $$V=-i_1N+i_4N \tag{6}$$

From Equations 2 and 5, $$V=-ji_1X+i_4R \tag{7}$$

Solving Equation 6 and 7 for $i_1$ yields $$i_1=-\frac{V(R-N)}{N(R-jX)} \tag{8}$$

From Equations 1 and 8, the final solution for Z is $$Z=-\frac{N}{R-N}(R-jX) \tag{9}$$

As is evident from Equation 9, the phase angle of Z is determined solely by the magnitudes of R and X and is in no way dependent upon N. The magnitude of N can thus be varied at will to adjust repeater gain without effect upon the phase angle of the resulting negative impedance. Phase-shifting network capacitor 14, moreover, permits the use of relatively small converter blocking capacitors since it contributes its effect to aid theirs. Thus both simplified gain adjustments and elimination of signaling pulse distortion are achieved by the present invention with extremely simple circuitry.

Figure 2:
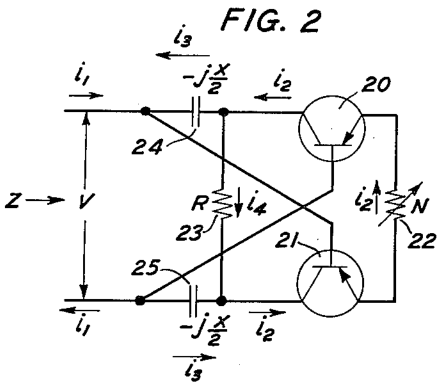
FIG. 2 is a simplified schematic of a push-pull shunt transistor negative impedance converter embodying the invention.

The embodiment of the invention illustrated in FIG. 2 differs from the one shown in FIG. 1 in that it includes two transistors 20 and 21 arranged to operate in push-pull. Both transistors are of the same conductivity type and a variable terminating resistor 22 is connected between their emitter electrodes. The combined input and output circuit for the converter is connected between the collector electrodes of transistors 20 and 21. Positive feedback in the negative impedance converter shown in FIG. 2 is provided by cross-coupling connections from the collector electrode of each transistor to the base electrode of the other. The fixed phase-shifting network provided by the present invention takes the form in FIG. 2 of a resistor 23 connected directly between the collector electrodes of transistors 20 and 21 and respective capacitors 24 and 25 connected between each end of resistor 23 and the base electrode of the opposite transistor. As in FIG. 1, transistors of either conductivity type may be used, although transistors of the p-n-p type are shown. Again, ideal transistors are assumed for the sake of simple explanation.

The effect of the invention upon the operation of the push-pull converter illustrated in FIG. 2 may be shown in a manner closely paralleling the mathematical explanation of FIG. 1. The same symbol notation is used: Z is the impedance presented by the converter, V is the voltage across its terminals, $i_1$ is the current flowing into and out of the converter, $i_2$ is the current flowing through terminating resistor 22 and in the internal emitter-collector paths of transistors 20 and 21, $i_3$ is the current flowing through capacitors 24 and 25, $i_4$ is the current in resistor 23, N is the value of terminating resistor 22, R is the value of network resistor 23, and $-jX/2$ is the impedance of each of capacitors 24 and 25.

In FIG. 2, the circuit equations are $$i_1=-i_3 \quad (10)$$

$$i_2=i_3+i_4 \quad (11)$$

$$V=i_2N \quad (12)$$

and $$V=ji_3X+i_4R \quad (13)$$

By inspection, Equations 10, 11, 12, and 13 are obviously identical to Equations 2 through 5 for FIG. 1. The solution for Z is, therefore, also identical:

$$Z=-\frac{N}{R-N}(R-jX) \quad (14)$$

Figure 3:
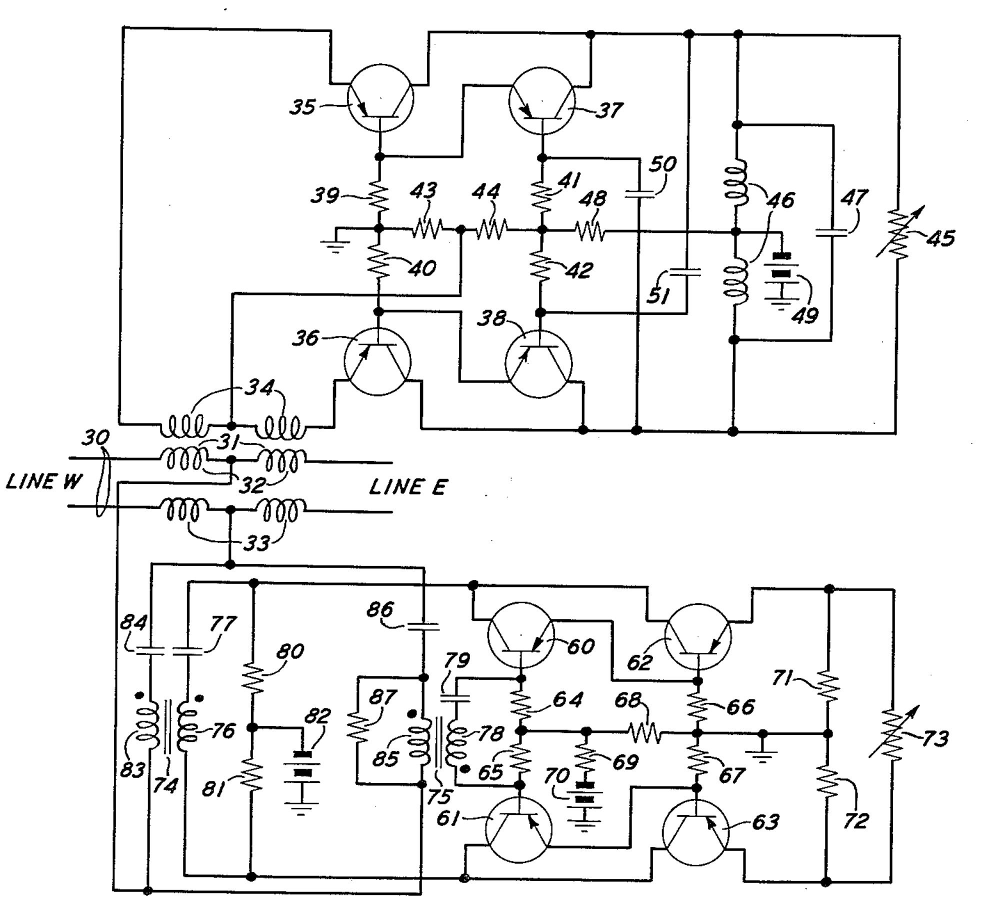
FIG. 3 is a schematic of a complete push-pull transistor voice-frequency negative impedance telephone repeater embodying the invention and employing both series and shunt negative impedance converters.

While the embodiments of the invention illustrated in FIGS. 1 and 2 are simplified shunt negative impedance converters, that shown in FIG. 3 is a complete voice-frequency negative impedance telephone repeater using both series and shunt converters coupled to a standard two-wire voice-frequency telephone transmission line 30. The phase angle of the repeater illustrated in FIG. 3 is supplied by the shunt converter exclusively. Gain, however, is adjusted by adjusting the magnitudes of the terminating resistances of both converters. Repeater gain is increased by increasing the terminating resistance of the series converter and decreasing the terminating resistance of the shunt converter. Repeater gain is decreased by the opposite adjustments.

The series converter in the embodiment of the invention illustrated in FIG. 3 closely resembles the push-pull series converter shown in FIG. 4 of the above-identified Linvill-Wallace patent. Each transistor of the Linvill-Wallace circuit, however, is replaced in the present circuit by two transistors in FIG. 3 to achieve more closely ideal transistor characteristics in the manner taught by United States Patent 2,663,806, issued December 22, 1958, to S. Darlington. The compound transistor α is more nearly unity than the α of a single transistor, and the gain of the circuit is kept substantially constant regardless of normal variations in individual amplification factors. Each compound transistor, however, functions substantially as a single transistor and may be treated, for the purposes of the present invention, as a single transistor.

The series converter in FIG. 3 is coupled to transmission line 30 through a transformer 31 having a split line winding providing two equal windings 32 and 33 in a balanced series connection with the line. Both halves of the line winding are provided with center taps for connecting to the shunt converter. The series converter winding 34 of transformer 31 is also center tapped.

The opposite ends of converter winding 34 of transformer 31 are connected to the emitter electrodes of respective push-pull p-n-p transistors 35 and 36. The base electrodes of transistors 35 and 36 are connected directly to the respective emitter electrodes of another similar pair of push-pull p-n-p transistors 37 and 38. The collector electrodes of transistors 35 and 37 are connected together, as are those of transistors 36 and 38. Transistors 35 and 37 thus function as one compound transistor and transistors 36 and 38 function as another.

The base electrodes of transistors 35 and 36 are connected together through two series resistors 39 and 40, while the base electrodes of transistors 37 and 38 are connected together through two series resistors 41 and 42. These resistors serve not only to bias the respective transistors to their proper operating points but also to reduce currents through the transistors during lightning surges on transmission line 30. A pair of resistors 43 and 44 are connected in series between the junction of resistors 39 and 40 and the junction of resistors 41 and 42 to form a voltage divider. The former junction is grounded, while the junction between resistors 43 and 44 is connected to the center tap of transformer winding 34.

The gain of the series converter is fixed by the setting of a variable terminating resistor 45 connected directly between the collector electrodes of transistors 37 and 38. To provide a high alternating-current impedance collector voltage supply for the transistors, a center-tapped inductor 46 is also connected between the collector electrodes of transistors 37 and 38. A capacitor 47 is connected in parallel with inductor 46. The total parallel impedance of inductor 46, capacitor 47, and variable terminating resistor 45 is held below the level of the impedance looking into transformer winding 34, thereby preserving stability against self-oscillation in the series converter. The inductance of inductor 46 is close to, but slightly less than, the self-inductance of line transformer winding 34. The effects of the two inductances thus tend to offset one another because they are nearly equal. The inductance of inductor 46 is smaller, however, to insure very low frequency stability where the inductance factors are controlling. At very high frequencies, stability is insured by the shunting effect of capacitor 47.

The biasing circuitry in the series portion of the negative impedance converter illustrated in FIG. 3 is completed by a resistor 48 connected from the midpoint of inductor 46 to the junction between resistors 41 and 42. A negative direct potential source, conventionally represented by battery 49, is connected to the center tap of inductor 46. Resistors 43, 44, and 48 divide the voltage from source 49 to provide correct biases for all transistors. Finally, the positive feedback circuit paths necessary for converter operation are provided by a coupling capacitor 50 connected from the base electrode of transistor 37 to the collector electrode of transistor 38 and by a coupling capacitor 51 connected from the base electrode of transistor 38 to the collector electrode of transistor 37.

The operation of the series converter illustrated in FIG. 3 is just the opposite of that of the shunt converters shown in FIGS. 1 and 2. Practically all of the current flowing from the line into each compound transistor flows out of the collector electrodes into the terminating resistor 45. This voltage is cross-coupled by capacitors 50 and 51 back to the base electrodes of the transistors and from there to the external converter terminals, practically undiminished because of the low operating transistor impedances between emitter and base. Hence, the voltage at the external converter terminals is practically the negative of the voltage across terminating resistor 45 and the impedance presented at the converter terminals is the negative of the resistance of terminating resistor 45. In the embodiment of the invention illustrated in FIG. 3, there is no phase angle imparted by the series converter.

The shunt converter in the embodiment of the invention illustrated in FIG. 3 is a more complete version of the shunt negative impedance converter shown in FIG. 2. It closely resembles the push-pull shunt converter shown in FIG. 5 of the above-identified Linvill-Wallace patent but incorporates a fixed phase-shifting network in its positive feedback path in accordance with the teachings of the present invention to impart a phase angle independent of the gain of the repeater.

The shunt converter in FIG. 3 includes a first pair of push-pull p-n-p transistors 60 and 61 and a second pair of push-pull p-n-p transistors 62 and 63. Transistors 60 and 62 are connected in the compound circuit arrangement disclosed in the above-identified Darlington patent, as are transistors 61 and 63. The collector electrodes of transistors 60 and 62 are connected together, and the collector electrodes of transistors 61 and 63 are similarly joined. The emitter electrode of transistor 60 is connected directly to the base electrode of transistor 62. Similarly, the emitter electrode of transistor 61 is connected directly to the base electrode of transistor 63. The base electrodes of transistors 60 and 61 are joined by two series resistors 64 and 65, and the base electrodes of transistors 62 and 63 are joined by two similar series resistors 66 and 67. All four of these resistors serve not only to bias the transistors to their proper operating points but also to reduce surge currents caused by lightning strokes on transmission line 30.

The junction between resistors 64 and 65 is joined to that between resistors 66 and 67 by a resistor 68. The former junction is returned through a dropping resistor 69 to a source of direct negative potential, conventionally represented by a battery 70, while the latter junction is grounded. A pair of relatively large resistors 71 and 72 are connected in series between the emitter electrodes of transistors 62 and 63, and the junction between them is also grounded. Resistors 71 and 72 complete the emitter biasing circuit for transistors 62 and 63, while resistors 68 and 69 cooperate to fix the proper emitter current and collector voltage biases for all transistors in the shunt converter.

In accordance with a principal feature of the invention, the shunt negative impedance converter illustrated in FIG. 3 is provided not only with a substantially purely resistive variable terminating impedance but also with a positive feedback circuit path which includes a fixed phase-shifting network. A variable terminating resistor 73 is connected directly between the emitter electrodes of transistors 62 and 63. Positive feedback is obtained in the shunt converter shown in FIG. 3 with the aid of two transformers 74 and 75. Of these, transformer 74 imparts no phase reversal and has its secondary winding 76 connected in series with a phase-shifting network capacitor 77 directly between the collector electrodes of transistors 60 and 61. Transformer 75, on the other hand, imparts one net phase reversal and has its secondary winding 78 connected in series with a feedback coupling capacitor 79 directly between the base electrodes of transistors 60 and 61. The circuit is completed by a pair of relatively large phase-shifting network resistors 80 and 81 connected in series between the collector electrodes of transistors 60 and 61. The junction between resistors 80 and 81 is returned to a negative direct potential source, conventionally represented by a battery 82.

The shunt converter in FIG. 3 is connected to transmission line 30 with the aid of the respective primary winding of transformers 74 and 75. The primary winding 83 of transformer 74 is connected in series with another phase-shifting network capacitor 84 between the center taps of windings 32 and 33 of line transformer 31. A similar series connection includes the primary winding 85 of transformer 75 and a second feedback coupling capacitor 86. Winding 85 is shunted by a resistor 87.

The phase-shifting network incorporated in the shunt converter in accordance with the present invention is made up of capacitors 77 and 84 and resistors 80 and 81. In Equation 14, derived in connection with FIG. 2, the factor R is made up of the total series resistance of resistors 80 and 81, while the factor X is controlled by the total series capacitance of capacitors 77 and 84. The phase angle thereby imparted to the negative impedance produced by the shunt converter and the repeater as a whole is independent of the gain setting of either converter.

While transformers 74 and 75 are both in the feedback path of the shunt converter illustrated in FIG. 3, their resistances and inductances are such that they have no appreciable effect upon the converter phase angle in the voice band. Both serve to block any longitudinal currents which may be present on transmission line 30 and prevent them from disturbing transistor biases. Transformer 75, of course, also provides the necessary phase reversal for the positive feedback circuit path about the two compound transistor circuits. Capacitors 84 and 86 are both kept relatively small in order to avoid forming a shunt path for signaling and dialing currents which need to pass through the repeater without loss. Capacitors 77 and 79 prevent the two transformers 74 and 75 from affecting the transistor biases and are also relatively small as seen from transmission line 30.

Both converters of the negative impedance repeater illustrated in FIG. 3 are made stable at frequencies outside of as well as within the voice frequency band for any termination conditions likely to be encountered in practice. As a direct result of the invention, however, the repeater as a whole is much simpler in its circuitry and operation than is any comparable repeater found in the prior art. Gain is varied by resistance adjustments alone, leaving a phase angle which matches the line at all times. Because of the relatively small blocking and phase shunt capacitors needed by the shunt converter, moreover, there is no important interference with signaling and dialing currents on the line.

It is to be understood that the above-described arrangements are illustrative of the application of the principles of the invention. Numerous other arrangements may be devised by those skilled in the art without departing from the spirit and scope of the invention.

What is claimed is:

1. A negative impedance converter presenting a phase angle substantially independent of gain which comprises an amplifying device having a current-emissive electrode, a current-receiving electrode, and a control electrode for current flowing between said current-emissive and current-receiving electrodes, a terminating impedance intercoupling said control electrode and one of the remaining electrodes of said amplifying device, said terminating impedance consisting substantially of pure resistance, combined input and output means intercoupling said control electrode and the other of said remaining electrodes of said amplifying device, a phase-inverting positive feedback circuit path intercoupling said current-receiving electrode and said control electrode, and a phase-shifting network included in said positive feedback circuit path, said phase-shifting network providing substantially the entire phase angle of the converter.

2. A negative impedance converter presenting a phase angle substantially independent of gain which comprises an amplifying device having a current-emissive electrode, a current-receiving electrode, and a control electrode for current flowing between said current-emissive and current-receiving electrodes, a terminating impedance intercoupling said control electrode and said current-emissive electrode, said terminating impedance consisting substantially of pure resistance, combined input and output means intercoupling said control electrode and said current-receiving electrode, a phase-inverting positive feedback circuit path intercoupling said current-receiving electrode and said control electrode, and a phase-shifting network providing substantially the entire amount of said converter phase angle included in said positive feedback circuit path.

3. A push-pull negative impedance converter presenting a phase angle substantially independent of gain which comprises a pair of amplifying devices each having a current-emissive electrode, a current-receiving electrode, and a control electrode for current flowing between said current-emissive and current-receiving electrodes, a terminating impedance intercoupling like ones of the current-emissive and current-receiving electrodes of said amplifying devices, said terminating impedance consisting substantially of pure resistance, combined input and output means intercoupling the remaining ones of the current-emissive and current-receiving electrodes of said amplifying devices, a positive feedback circuit path intercoupling the current-receiving electrode of each of said amplifying devices with the control electrode of the other of said amplifying devices, and a phase-shifting network included in said positive feedback circuit path, said phase-shifting network providing substantially the entire phase angle of the converter.

4. A push-pull negative impedance converter presenting a phase angle substantially independent of gain which comprises a pair of amplifying devices each having a current-emissive electrode, a current-receiving electrode, and a control electrode for current flowing between said current-emissive and current-receiving electrodes, a terminating impedance intercoupling the current-emissive electrodes of said amplifying devices, said terminating impedance consisting substantially of pure resistance, combined input and output means intercoupling the current-receiving electrodes of said amplifying devices, a positive feedback circuit path intercoupling the current-receiving electrode of each of said amplifying devices with the control electrode of the other of said amplifying devices, and a phase-shifting network providing substantially the entire amount of said converter phase angle included in said positive feedback circuit path.

5. In combination with a two-wire bilateral signal transmission line, a negative impedance repeater presenting a phase angle to said transmission line substantially independent of gain which includes a first negative impedance converter comprising a first amplifying device having a current-emissive electrode, a current-receiving electrode, and a control electrode for current flowing between said current-emissive and current-receiving electrodes, a first terminating impedance intercoupling the control and current-receiving electrodes of said first amplifying device, said first terminating impedance consisting substantially of pure resistance, combined input and output means coupling said first negative impedance converter in series with said line and intercoupling the control and current-emissive electrodes of said first amplifying device, and a first phase-inverting positive feedback circuit path intercoupling the current-receiving and control electrodes of said first amplifying device, and a second negative impedance converter comprising a second amplifying device having a current-emissive electrode, a current-receiving electrode, and a control electrode for current flowing between said current-emissive and current-receiving electrodes, a second terminating impedance intercoupling the control and current-emissive electrodes of said second amplifying device, said second terminating impedance consisting substantially of pure resistance, combined input and output means coupling said second negative impedance converter in shunt across said line and intercoupling the control and current-receiving electrodes of said second amplifying device, a second phase inverting positive feedback circuit path intercoupling the current-receiving and control electrodes of said second amplifying device, and a phase-shifting network included in said second positive feedback circuit path, said phase-shifting network providing substantially the entire phase angle of the repeater.

6. In combination with a two-wire bilateral signal transmission line, a negative impedance repeater presenting a phase angle to said transmission line substantially independent of gain which includes a first push-pull negative impedance converter comprising a first pair of amplifying devices each having a current-emissive electrode, a current-receiving electrode, and a control electrode for current flowing between said current-emissive and current-receiving electrodes, a first terminating impedance intercoupling the current-receiving electrodes of said first pair of amplifying devices, said first terminating impedance consisting substantially of pure resistance, combined input and output means coupling said first negative impedance converter in series with said line and intercoupling the current-emissive electrodes of said first pair of amplifying devices, and a first positive feedback circuit path intercoupling the current-receiving electrode of each of said first pair of amplifying devices with the control electrode of the other of said first pair of amplifying devices, and a second push-pull negative impedance converter comprising a second pair of amplifying devices each having a current-emissive electrode, a current-receiving electrode, and a control electrode for current flowing between said current-emissive and current-receiving electrodes, a second terminating impedance intercoupling the current-emissive electrodes of said second pair of amplifying devices, said second terminating impedance consisting substantially of pure resistance, combined input and output means coupling said second negative impedance converter in shunt across said line and intercoupling the current-receiving electrodes of said second pair of amplifying devices, a second positive feedback circuit path intercoupling the current-receiving electrode of each of said second pair of amplifying devices with the control electrode of the other of said second pair of amplifying devices, and a phase-shifting network providing substantially the entire amount of said repeater phase angle included in said second positive feedback circuit path.

7. A negative impedance converter presenting a phase angle substantially independent of gain which comprises a transistor having an emitter electrode, a collector electrode, and a base electrode, a variable terminating impedance intercoupling said base electrode and one of the remaining electrodes of said transistor, said terminating impedance consisting substantially of pure resistance and fixing the gain of said converter, combined input and output means intercoupling said base electrode and the other of said remaining electrodes of said transistor, a phase-inverting positive feedback circuit path intercoupling said collector electrode and said base electrode, and a capacitive phase-shifting network included in said positive feedback circuit path and fixing the phase angle of said converter at substantially the phase angle of said phase-shifting network.

8. A negative impedance converter presenting a phase angle substantially independent of gain which comprises a transistor having an emitter electrode, a collector electrode, and a base electrode, a variable terminating impedance intercoupling said base electrode and said emitter electrode, said terminating impedance consisting substantially of pure resistance and fixing the gain of said converter, combined input and output means intercoupling said base electrode and said collector electrode, a phase-inverting positive feedback circuit path intercoupling said collector electrode and said base electrode, and a capacitive phase-shifting network included in said positive feedback circuit path and fixing the phase angle of said converter at substantially the phase angle of said phase-shifting network.

9. A push-pull negative impedance converter presenting a phase angle substantially independent of gain which comprises a pair of transistors each having an emitter electrode, a collector electrode, and a base electrode, a variable terminating impedance intercoupling like ones of the emitter and collector electrodes of said transistors, said terminating impedance consisting substantially of pure resistance and fixing the gain of said converter, combined input and output means intercoupling the remaining ones of the emitter and collector electrodes of said transistors, a positive feedback circuit path intercoupling the collector electrode of each of said transistors with the base electrode of the other of said transistors, and a capacitive phase-shifting network included in said positive feedback circuit path and fixing the phase angle of said converter at substantially the phase angle of said phase-shifting network.

10. A push-pull negative impedance converter presenting a phase angle substantially independent of gain which comprises a pair of transistors each having an emitter electrode, a collector electrode, and a base electrode, a variable terminating impedance intercoupling the emitter electrodes of said transistors, said terminating impedance consisting substantially of pure resistance and fixing the gain of said converter, combined input and output means intercoupling the collector electrodes of said transistors, a positive feedback circuit path intercoupling the collector electrode of each of said transistors with the base electrode of the other of said transistors, and a capacitive phase-shifting network included in said positive feedback circuit path and fixing the phase angle of said converter at substantially the phase angle of said phase-shifting network.

11. In combination with a two-wire bilateral signal transmission line, a negative impedance repeater presenting a phase angle to said transmission line substantially independent of gain which includes a first negative impedance converter comprising a transistor having an emitter electrode, a collector electrode, and a base electrode, a first variable terminating impedance intercoupling the base and collector electrodes of said first transistor, said first terminating impedance consisting substantially of pure resistance and fixing the gain of said first converter, combined input and output means coupling said first negative impedance converter in series with said line and intercoupling the base and emitter electrodes of said first transistor, and a first phase-inverting positive feedback circuit path intercoupling the collector and base electrodes of said first transistor, and a second negative impedance converter comprising a second transistor having an emitter electrode, a collector electrode, and a base electrode, a second variable terminating impedance intercoupling the base and emitter electrodes of said second transistor, said second terminating impedance consisting substantially of pure resistance and fixing the gain of said second converter, combined input and output means coupling said second negative impedance converter in shunt across said line and intercoupling the base and collector electrodes of said second transistor, a second phase-inverting positive feedback circuit path intercoupling the collector and base electrodes of said second transistor, and a capacitive phase-shifting network included in said second positive feedback circuit path and fixing the phase angle of the entire repeater at substantially the phase angle of said phase-shifting network.

12. In combination with a two-wire bilateral signal transmission line, a negative impedance repeater presenting a phase angle to said transmission line substantially independent of gain which includes a first push-pull negative impedance converter comprising a first pair of transistors each having an emitter electrode, a collector electrode, and a base electrode, a first variable terminating impedance intercoupling the collector electrodes of said first pair of transistors, said first terminating impedance consisting substantially of pure resistance and fixing the gain of said first converter, combined input and output means coupling said first negative impedance converter in series with said line and intercoupling the emitter electrodes of said first pair of transistors, and a first positive feed-back circuit path intercoupling the collector electrode of each of said first pair of transistors with the base electrode of the other of said first pair of transistors, and a second push-pull negative impedance converter comprising a second pair of transistors each having an emitter electrode, a collector electrode, and a base electrode, a second variable terminating impedance intercoupling the emitter electrodes of said second pair of transistors, said second terminating impedance consisting substantially of pure resistance and fixing the gain of said second converter, combined input and output means coupling said second negative impedance converter in shunt across said line and intercoupling the collector electrodes of said second pair of transistors, a second positive feedback circuit path intercoupling the collector electrode of each of said second pair of transistors with the base electrode of the other of said second pair of transistors, and a capacitive phase-shifting network included in said second positive feedback circuit path and fixing the phase angle of the entire repeater at substantially the phase angle of said phase-shifting network.

References Cited in the file of this patent

UNITED STATES PATENTS

| | | |
|---|---|---|
| 2,523,294 | Hallmark | Sept. 26, 1950 |
| 2,547,740 | Broos | Apr. 3, 1951 |
| 2,726,370 | Linvill | Dec. 6, 1955 |
| 2,878,325 | Merrill | Mar. 17, 1959 |